G. KNOWLING, Jr.
DEMOUNTABLE RIM.
APPLICATION FILED FEB. 26, 1918.

1,313,824.

Patented Aug. 19, 1919.
2 SHEETS—SHEET 1.

WITNESSES
H. J. Walker
B. Joffe

INVENTOR
G. Knowling Jr.
BY
ATTORNEYS

G. KNOWLING, Jr.
DEMOUNTABLE RIM.
APPLICATION FILED FEB. 26, 1918.
1,313,824.
Patented Aug. 19, 1919.
2 SHEETS—SHEET 2.
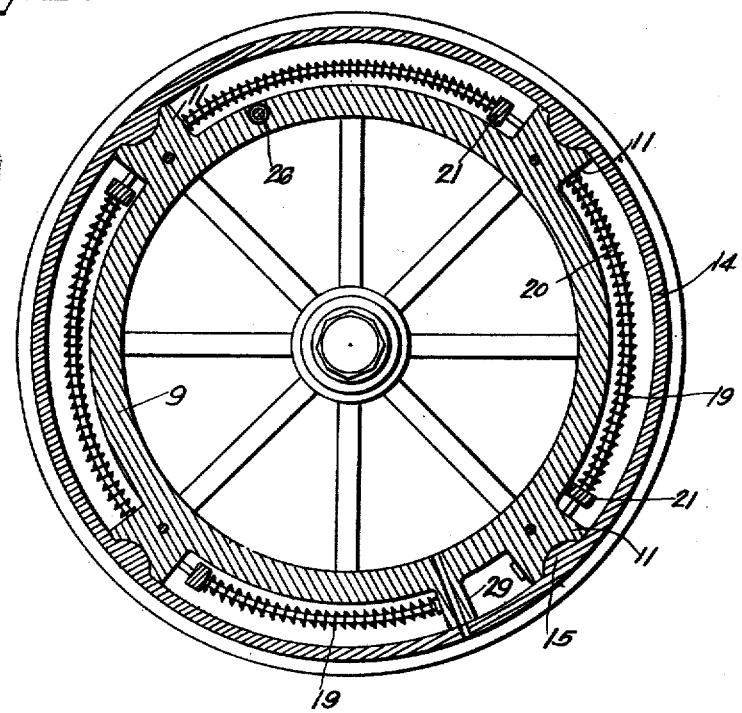
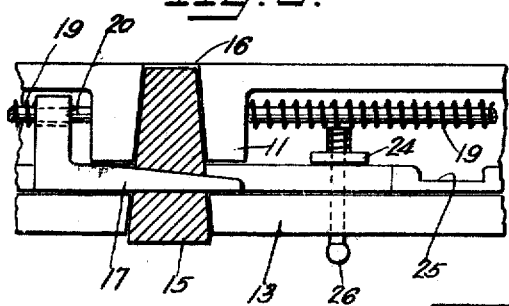
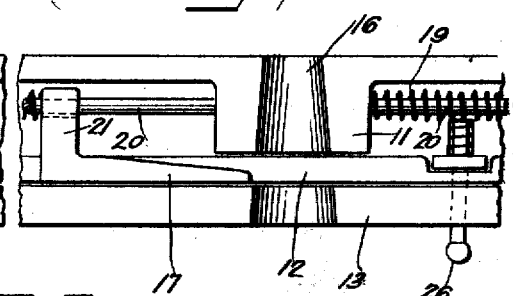
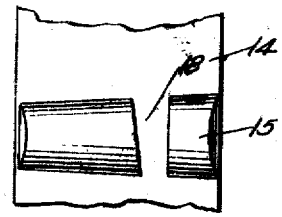
WITNESSES
H. T. Walker
B. Joffe
INVENTOR
G. Knowling Jr.
BY
ATTORNEYS

UNITED STATES PATENT OFFICE

GEORGE KNOWLING, JR., OF ST. JOHN, NEWFOUNDLAND.

DEMOUNTABLE RIM.

1,313,824.

Specification of Letters Patent.

Patented Aug. 19, 1919.

Application filed February 26, 1918. Serial No. 219,230.

*To all whom it may concern:*

Be it known that I, GEORGE KNOWLING, Jr., a citizen of Newfoundland, and a resident of St. John, Newfoundland, have invented a new and Improved Demountable Rim, of which the following is a full, clear, and exact description.

My invention relates to demountable rims, and has reference more particularly to means for locking the rim on the wheel body.

An object of the invention is to provide a simple and convenient demountable rim which can be easily and quickly removed from the wheel body.

Another object of the invention is to provide a demountable rim which is equipped with locking wedges normally retained in position by yielding means and which wedges prevent an axial movement of the demountable rim on the wheel body.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Fig. 5 is a vertical section on line 5—5, Fig. 2;

Fig. 6 is a section on line 6—6, Fig. 2;

Fig. 7 is a fragmentary top plan view on the fixed rim when the demountable rim is removed; and Fig. 8 is a fragmentary inside view on the wedge provided on the demountable rim.

Figure 1:
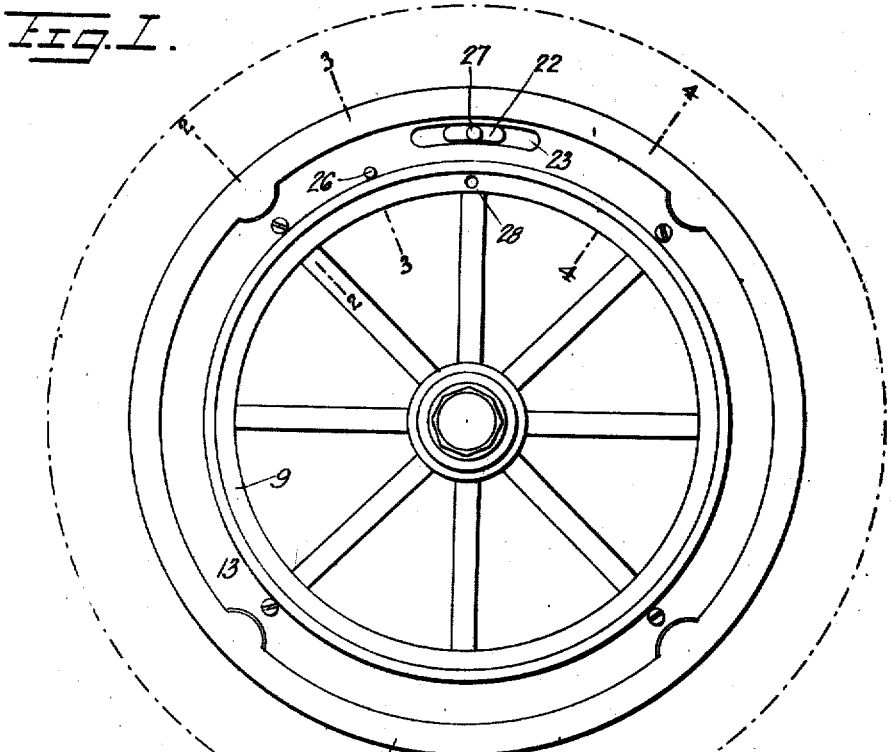
Figure 1 is an elevation of a wheel provided with a demountable rim emboying my invention.
Figure 2:
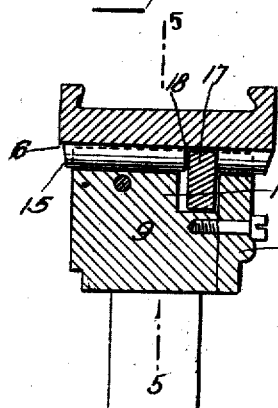
Fig. 2 is a cross section on line 2—2, Fig. 1.
Figure 3:
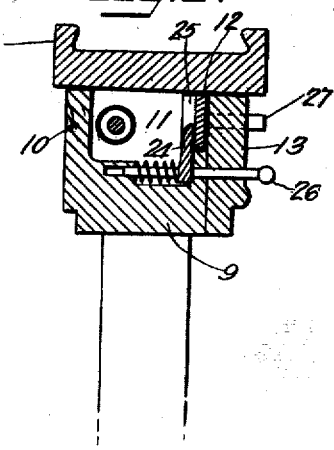
Fig. 3 is a similar section on line 3—3, Fig. 1.
Figure 4:
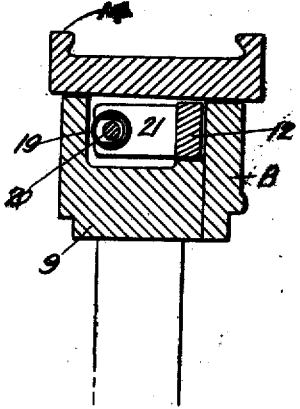
Fig. 4 is a cross section on line 4—4, Fig. 1.

Referring to the drawings, 9 is a fixed rim which has a rising flange 10, preferably flush with the rear face of the fixed rim. The said rim has also lugs 11 on the periphery which extend from the flange through a portion of the fixed rim's width. A ring 12 is mounted to revolve on the fixed rim between the lugs 11 and a flange 13 secured to the front face of the said rim. The periphery formed by the flanges and the lugs of the fixed rim is tapering, the larger diameter being at the rear face, to properly fit the tapering inner surface of the demountable rim 14. The said rim has on the inner periphery tapering keys 15 which are disposed symmetrically with the lugs 11 and for which the lugs and flanges are provided with tapering grooves 16, the widest end of the grooves and keys being at the front faces of the fixed and demountable rims respectively.

The ring 12 has wedge sections 17 in proximity of each lug 11 and for which wedge each key 15 has a corresponding wedge-shaped slot 18 adapted to be engaged by the wedge and thereby draw the removable rim tightly on to the fixed rim over the entire periphery. The engagement of the wedges 17 with the keys 15 is maintained by springs 19 which are preferably mounted on rods 20 extending between the lugs 11. The ring 12 has lateral extensions 21 adapted to be disposed between the lugs 11 and to engage the corresponding rod 20, so that one end of a corresponding spring is engaged with said lateral extension 21 and the other against a lug 11. The tendency of the springs is to move the ring to bring the wedges across the grooves 16 and thereby into engagement with the keys 15.

To disengage the removable rim from the fixed rim it is necessary to disengage the wedge sections 17 of the ring from the keys 15, and for that purpose the ring is provided with a lateral lug 22 projecting through a slot 23 in the flange 13. By moving said lug against the resistance of the springs 19 the wedges may be disengaged from the keys. To retain the ring in position when the wedges are disengaged from the keys, a spring-actuated latch 24 is provided which is adapted to snap into a recess or notch 25 provided in the removable rim when said recess alines with the latch. The latch has a pin 26 which projects through a flange 13 and whereby said latch may be disengaged from the ring and the same subjected to the action of the springs 19.

To facilitate the displacement of the ring, the lug 22 may be provided with means 27 which are to be engaged by a key or wrench adapted to be fulcrumed in a suitable portion 28 of the fixed rim 9.

The fixed rim 9 has a suitable lug 29 having a radiating aperture for admitting the air valve of the pneumatic tube carried by the rim 14, which has also an aperture for the valve adapted to aline with the aperture in the lug 29 when the removable rim is mounted on the fixed rim.

It will be noted that when the ring has been rotated to bring the notch 25 into alinement with the latch 24 the latch will immediately engage the ring to prevent the return of said ring to its original position under the action of the springs 19 until the latch is disengaged from the ring by pressing the pin 26. It will therefore be seen that the demountable rim can be easily and quickly removed from the fixed rim and another detachable rim substituted therefor.

I claim:

1. In combination with a wheel body provided on its periphery with lugs having tapering grooves, tapering keys on the inner face for engaging the grooved lugs of the body whereby a relative rotary movement between the body and the rim is prevented but said rim is free to move axially on said body, a ring revolubly mounted in said body, wedge sections associated with said ring, said keys having intermediate their ends transverse wedge-shaped slots adapted to be engaged by said wedge sections, whereby the axial displacement of the rim on the body is prevented, yielding means in said body engaging the ring and normally tending to move the wedge sections of same into engagement with the keys, and means whereby said ring may be operated from the outer face of the body to move said ring against the resistance of the yielding means and disengage said wedge sections of the ring from the keys.

2. In combination with a wheel body having a tapering periphery the diameter of which is smaller at the outer face, a detachable rim having an inner tapering periphery adapted to fit snugly on to the body, keys on the tapering periphery of the rim having a taper decreasing in width toward the rear face of the rim, said body having tapering grooves adapted to receive the keys and whereby the rim has only an axial movement relative to said body, a ring revolubly mounted in the body, wedge sections on said ring, said keys having wedge-shaped notches adapted to be engaged by the wedge sections of the rim, springs for moving the ring to bring the wedge sections into engagement with the notches of the keys whereby the ring is drawn tightly on to the body, said ring having means on the outer face of the body wherethrough the ring may be manipulated to move the same against the resistance of the springs, and a spring-actuated latch adapted to engage the ring when the wedge sections are moved out of engagement with the keys and retain said ring in that position against the resistance of the springs whereby the rim may be disengaged from the body.

3. In a wheel, a wheel body having side flanges and lugs on its periphery, the flanges and lugs being provided with grooves, a detachable rim having slotted keys fitting in said grooves, a ring revolubly mounted in the body and provided with wedge shaped members adapted for engaging the slots of the keys and with apertured lateral extensions, rods mounted between the lugs of the body and passing through the extensions of the ring, springs on the rods between the extensions and lugs, means for operating the ring from one face of the body, means for locking the ring against the action of the springs.

4. In a wheel, a wheel body having side flanges and lugs on its periphery, the flanges and lugs being provided with grooves and one of the flanges with a slot, a detachable rim having slotted lugs fitting in said grooves, a ring revolubly mounted in the body between the lugs and one flange and provided with wedge shaped members engaging the slots of the keys, apertured lateral extensions, and a lateral lug projecting through the slot of the body, rods mounted in the body between the lugs thereof and passing through the apertures of the extensions of the ring, springs on the rods between the extensions and lugs, and means for locking the ring against the action of the springs.

GEORGE KNOWLING, Jr.